Nov. 10, 1970 J. R. DUKE ET AL 3,539,945
METHODS OF MODULATING INJECTION DIODES
FOR MAXIMUM OPTICAL POWER
Filed March 25, 1969
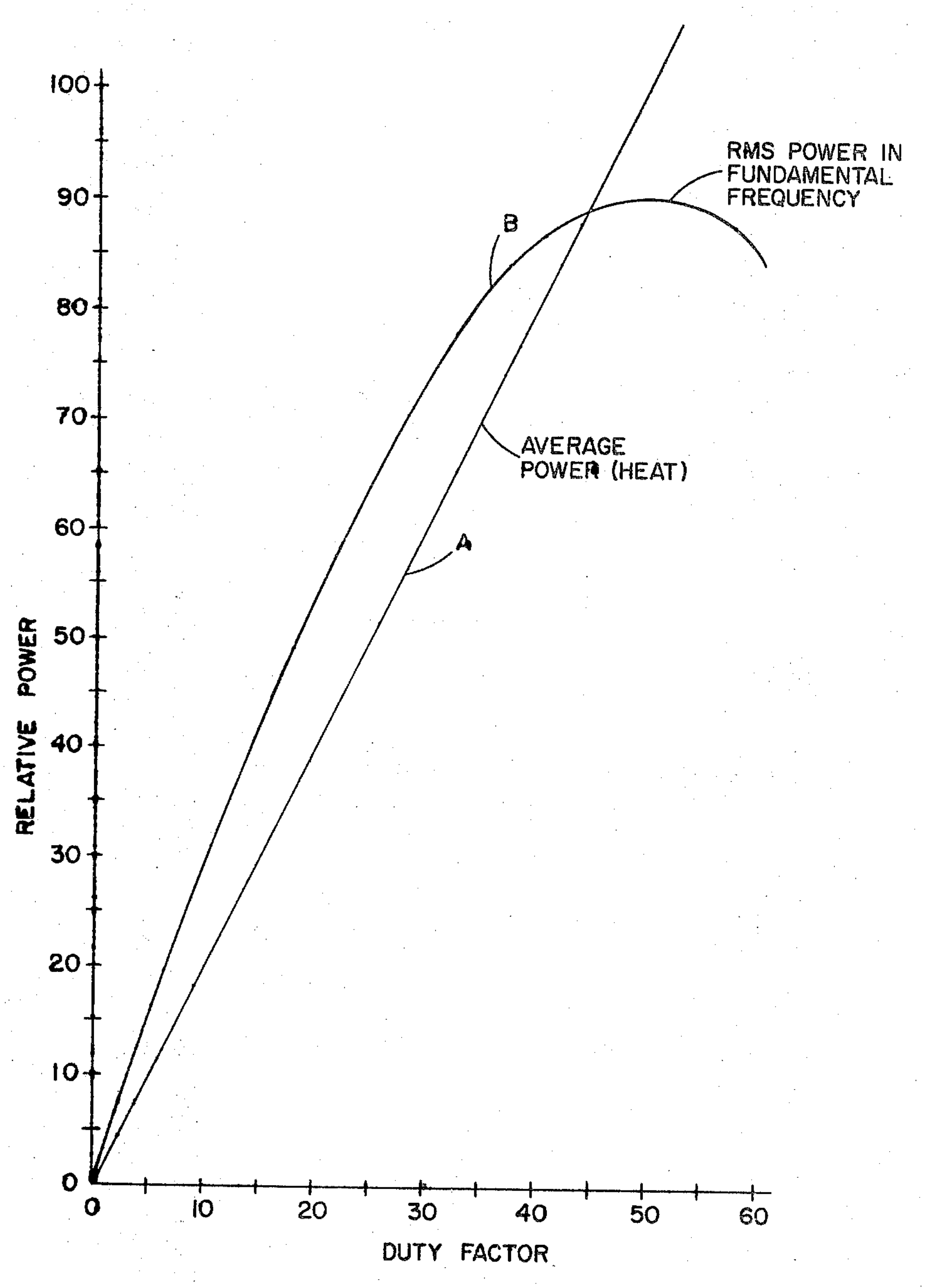
Jimmy R. Duke
Walter E. Miller, Jr.
INVENTORS.
BY Harry M. Saragovitz
Edward J. Kelly
Herbert Berl
Aubrey J. Dunn United States Patent Office 3,539,945
Patented Nov. 10, 1970

3,539,945

METHODS OF MODULATING INJECTION DIODES FOR MAXIMUM OPTICAL POWER

Jimmy R. Duke and Walter E. Miller, Jr., Huntsville, Ala., assignors to the United States of America as represented by the Secretary of the Army Filed Mar. 25, 1969, Ser. No. 810,302
Int. Cl. H01s 3/00
U.S. Cl. 332—7.51 3 Claims

ABSTRACT OF THE DISCLOSURE

An injection (light emitting) diode is powered by a rectangular current wave, with either the duty factor or the maximum amplitude (or both) of the wave being set to realize maximum optical power. The duty factor or amplitude settings (or both) are determined by partial differential solutions of the equation which defines the optical power in terms of the diode characteristics.

BACKGROUND OF THE INVENTION

The invention generally relates to methods for modulating (or pulsing) injection diodes. Recent advances in the state of the art of incoherent GaAs injection diodes have been made, and single diodes are now available with an optical output of ½-watt average power at efficiencies of 0.08 to 0.10 watt/watt. This advance of about an order of magnitude makes feasible many new applications of these solid state light sources. The ease with which these diodes may be modulated (DC to megahertz) enhances their desirability for some applications. However, switching the 5–15 amperes peak current required for these diodes presents some problems. Ordinary CW (sine wave) operation is undesirable for two reasons. First, the optical output of the diodes is not a linear function of current, and distortion of the sine wave results. Second, the modulator can be made more efficient if operated in a rectangular wave (on-off) mode. These diodes are often modulated in applications where only the RMS power in a fundamental frequency is of value. Since the efficiency of these devices is dependent upon their average power (heat) dissipation, the maximum optical power output is limited by the heat dissipation. Our invention allows optimum effectiveness (maximum RMS power is the fundamental frequency) to be obtained.

SUMMARY OF THE INVENTION

An injection diode is modulated by a rectangular current waveform, with maximum optical output from the diode being obtained by setting either the duty factor as the maximum amplitude (or both) of the current in accordance with the partial differential solutions of the equation:

$$P_{rms} = [(E_{HS})(I)][(0.707)(2/\pi \sin \pi df)]\left\{(E_J)\left[\frac{Z(df)(VI+I^2R)}{b}\right]\right\}$$

wherein $df$ is the duty factor of the rectangular current waveform,

I is the peak current through the diode,
V is the diode junction voltage,
R is the diode series resistance,
Z is the diode thermal impedance,
$E_{HS}$ is the diode quantum efficiency at 25° C. in the absence of heating effects, converted to watts/amp.,
$E_J$ represents the reduction of quantum efficiency in the presence of junction heating, with a junction temperature rise of $b$, and
$b$ is the temperature rise of the junction at which $E_J$ is determined, and which rise should approximately equal the expetced operating temperating rise.

With a fixed peak current, the duty factor (for maximum optical power) of the current is the solution of the equation $$\left(\frac{\delta P_{rms}}{\delta df}\right)_I = 0 \tag{1}$$

With a fixed duty factor, the peak current for maximum optical power is the solution of the equation:

$$\left(\frac{\delta P_{rms}}{\delta I}\right)df = 0 \tag{2}$$

If both peak current and duty factor can be varied, the optimum peak current and optimum duty factor are the simultaneous solutions of Equations 1 and 2 above.

BRIEF DESCRIPTION OF THE DRAWING

The single drawing shows curves of optical and heat power vs. duty factor.

DESCRIPTION OF THE PREFERRED EMBODIMENT

Curve A of the drawing shows a plot of average power (heat) vs. duty factor, and obtains for a resistive load supplied with a rectangular current wave. Curve B shows the relation of RMS power (in the fundamental current frequency) vs. duty factor. As can be seen, curve A is linear, but curve B is not, but reaches its maximum value at 50% duty factor. Curve B is obtained from a Fourier expansion of a rectangular wave with pulse amplitude $P_{avg.}/df$ which expansion gives the equation:

$$P_{rms} = \frac{P_{avg.}}{df}(0.707)\left[\frac{2}{\pi}\sin(\pi df)\right] \tag{3}$$

wherein $df$ is the duty factor of the wave, and $P_{avg.}$ is the average input power. This equation is misleading, since it leads one to believe that $P_{rms}$ is greatest with $df=0$, since one might assume that a constant average power is maintained as the duty factor is decreased to small values. In GaAs injection diodes, the power conversion efficiency *varies* as a function of input power, and negates the equation. In order to obtain proper equation, it is necessary to have information on diode characteristics.

A particular diode with which the inventive methods may be used in that bearing part number OSX–1209, produced by Texas Instruments. This diode has a quantum efficiency ($E_{HS}$) of from 10% to 14%, or about 0.16±0.02 watts/amp., at 25° C. Using the lower value, average optical power in the absence of heating is given by:

$$P_{25} = E_{HS} I(df) \tag{4a}$$

$$= 0.14I(df) \tag{4b}$$

where $P_{25}$=average output power at 25° C. junction temperature, and I=peak current.

Since energy conversion is dependent on junction temperature, another equation beyond (4) is necessary, and this takes the form:

$$P_{TJ} = P_{25J} E_J^{\frac{T_{J-25}}{b}} \tag{5a}$$

$$= P_{25J}(.875)^{\frac{T_{J-25}}{20.3}} \tag{5b}$$

where $P_{TJ}$=average power output at junction $b$ is an approximation to the expected junction temperature rise, and $E_J$ is the relative efficiency at this temperature rise, temperature T and current J, $P_{25J}$=average power output (a) junction temperature of 25° C. and peak current J, and $T_J$=junction temperature for current J.

Equation 5 was obtained experimentally from the diode mentioned above. This diode has the following physical constants.

junction voltage=V=1.27 volts,
series resistance=R=0.16 ohm,
thermal impedance=Z=8.0 degrees C./watt.

The junction temperature is determined by the input power, and is given by the following equation:

$$T=T_{HS}+Z(VI+RI^2)df \qquad (6a)$$

$$=T_{HS}+8.0(1.27I+0.16I^2)df \qquad (6b)$$

where T=junction operating temperature, and $T_{HS}$=heat sink temperature

The combination of Equations 4, 5, and 6 above yields the average optical output power as a function of heat sink temperature, peak current, and duty *factor*, and has the form:

$$P_{avg.}=E_{HS}I(df)(E_J)^{\left[\frac{T_{HS}+Z(VI+RI^2)df-25}{b}\right]} \qquad (7a)$$

$$=E_{HS}I(df)(0.875)^{\left[\frac{T_{HS}+Z(VI+RI^2)df-25}{20.3}\right]} \qquad (7b)$$

$$=0.14I(df)(0.875)^{\left[\frac{T_{HS}+8(1.27I+0.16I^2)df-25}{20.3}\right]} \qquad (7c)$$

$$=14I(df)(0.875)^{\left[\frac{T_{HS}-25+(0.50I+0.063I^2)df}{20.3}\right]} \qquad (7d)$$

if the heat sink is maintained at 25° C., Equation 7*d* reduces to:

$$P_{avg.}=14I(df)(0.0875)^{(0.50I+0.063I^2)df} \qquad 7(e)$$

If one combines Equations 3 and 7*a*, and assumes that the heat sink is maintained at 25°, the following equation is obtained:

$$[P_{rms}=(E_{HS})(I)][(0.707)(2/\pi\sin\pi df)]\left\{(E_J)^{\left[\frac{Z(df)(VI+I^2R)}{b}\right]}\right\} \qquad (8a)$$

The combination of Equations 3 and 7*e* gives:

$$P_{rms}=0.14I(0.707)(2/\pi\ \sin\ \pi df)(0.875)^{(0.50I+0.063I^2)df} \qquad (8b)$$

For a fixed peak current, one may determine the optimum duty factor of the current by setting a partial differential solution of Equation 8 to zero thusly:

$$\left(\frac{\delta P_{rms}}{\delta df}\right)_I=0 \qquad (9)$$

For a fixed duty factor, one may determine the optimum peak current by setting a partial differential solution of Equation 8 to zero thusly:

$$\left(\frac{\delta P_{rms}}{\delta I}\right)_{df}=0 \qquad (10)$$

If the physical constants as set forth above are used in Equation 9, the following solution is obtained:

$$\left(\frac{\delta P_{rms}}{\delta df}\right)=[2\cos\pi df+(2/\pi\sin\pi df)(-0.067I-0.0084I^2)][0.10I(0.875)(0.50I+0.063I^2)df]=0 \qquad (11a)$$

In solving for *df*, for the second term in the brackets to be zero, duty factor must be infinite, which is not an acceptable solution. Therefore, $$2\cos\pi df+(2/\pi\sin\pi df)(-0.067I-0.004I^2)=0 \qquad (11b)$$

and tan $$df=-\frac{\pi}{(0.67I+0.0084I^2)}$$

Finally solving for *df*, we obtain:

$$df=\frac{\arctan\frac{\pi}{(0.67I+0.0084I^2}}{\pi}$$

If the physical constants of the diode as set forth above are used in Equation 10, the following is obtained:

$$\left(\frac{\delta P_{rms}}{\delta I}\right)=\left[\frac{.20}{\pi}\sin\pi\ df\right][(.875)^{(.50I+.063I^2)df}] \qquad (12a)$$

$$=1+df(-.067I-.0168I^2)=0 \qquad (12b)$$

Solving for I, the first term in brackets is a constant, and setting the second term equal to zero requires I to be infinite, an unacceptable answer.

Therefore $1+df(-.067I-0168I^2)=0$ or (12*c*)

$$I=\frac{-6.7\pm\sqrt{44.9+\frac{672}{df}}}{3.36} \qquad (12d)$$

With the same physical constants, the simultaneous solution of Equations 9 and 10 yields values of 11.75 peak amperes for I and 33.2% for *df*.

The above described inventive methods may be used with any number of known circuits capable of varying the duty factor and/or peak current of a rectangular current wave. One such circuit is that taught in Section 6–4 of the Motorola Semiconductor Circuits Manual, which manual carries a copywrite date of 1964 by Motorola, Inc.

What is claimed is:

1. A method of exciting a light emitting diode by a rectangular current waveform, wherein the RMS fundamental component of optical power ($P_{rms}$) of said diode is defined by the equation:

$$P_{rms}=[(E_{HS})(I)][(0.707)(2/\pi\sin\pi df)]\left\{(E_J)^{\left[\frac{Z(df)(VI+I^2R)}{b}\right]}\right\}$$

wherein *df* is the duty factor of the rectangular current waveform,

I is the peak current through the diode,
V is the diode junction voltage,
R is the diode series resistance,
Z is the diode thermal impedance,
$E_{HS}$ is the diode quantum efficiency at 25° C. in the absence of heating effects, converted to watts/amp.,
$E_J$ represents the reduction of quantum efficiency in the presence of junction heating, with a junction temperature rise of *b*, and
*b* is the temperature rise of the junction at which $E_J$ is determined, and which rise should approximately equal the expected operating temperature rise;

including the steps of:
generating said rectangular current waveform,
applying said waveform to said diode, and
setting the duty factor and the peak current of said current waveform, for a maximum $P_{rms}$ in accordance with the simultaneous solutions of the equations:

$$\left(\frac{\delta P_{rms}}{\delta df}\right)_I=0 \text{ and } \left(\frac{\delta P_{rm}}{\delta I}\right)_{df}=0$$

2. A method of exciting a light emitting diode by a rectangular current waveform, wherein the RMS fundamental component of optical power ($P_{rms}$) of said diode is defined by the equation:

$$P_{rms}=[(E_{HS})(I)][(0.707)(2/\pi\sin\pi df)]\left\{(E_J)^{\left[\frac{Z(df)(VI+I^2R)}{b}\right]}\right\}$$

wherein $df$ is the duty factor of the rectangular current waveform,

I is the peak current through the diode,

V is the diode junction voltage,

R is the diode series resistance,

Z is the diode thermal impedance, $E_{HS}$ is the diode quantum efficiency at 25° C. in the absence of heating effects, converted to watts/amp., $E_J$ represents the reduction of quantum efficiency in the presence of junction heating, with a junction temperature rise of $b$, and $b$ is the temperature rise of the junction at which $E_J$ is determined, and which rise should approximately equal the expected operating temperature rise;

including the steps of:

generating said rectangular current waveform, applying said waveform to said diode, and setting the duty factor of said current waveform, for a maximum $P_{rms}$ at a fixed peak current of said waveform, in accordance with the solution of the equation:

$$\left(\frac{\delta P_{rms}}{\delta df}\right)_I = 0$$

3. A method of exciting a light emitting diode by a rectangular current waveform, wherein the RMS fundamental component of optical ($P_{rms}$) of said diode is defined by the equation:

$$P_{rms} = [(E_{HS})(I)][(0.707)(2/\pi \sin \pi df)]\left\{(E_J)^{\left[\frac{Z(df)(VI+I^2R)}{b}\right]}\right\}$$

wherein $df$ is the duty factor of the rectangular current waveform,

I is the peak current through the diode,

V is the diode junction voltage,

R is the diode series resistance,

Z is the diode thermal impedance, $E_{HS}$ is the diode quantum efficiency at 25° C. in the absence of heating effects, converted to watts/amp., $E_J$ represents the reduction of quantum efficiency in the presence of junction heating, with a junction temperature rise of $b$, and $b$ is the temperature rise of the junction at which $E_J$ is determined, and which rise should approximately equal the expected operating temperature rise;

including the steps of:

generating said rectangular current waveform, applying said waveform to said diode, and setting the peak current of said current waveform, for a maximum $P_{rms}$ at a fixed duty factor of said waveform, in accordance with the solution of the equation:

$$\left(\frac{\delta P_{rms}}{\delta I}\right)_{df} = 0$$

References Cited

UNITED STATES PATENTS 3,245,002 4/1966 Hall ---------------- 332—7.51

RICHARD A. FARLEY, Primary Examiner

J. G. BAXTER, Assistant Examiner

U.S. Cl. X.R.

331—94.5